March 31, 1936.  E. W. BRINKMAN  2,035,942

FEED FINGER FOR SCREW MACHINES AND THE LIKE

Filed Oct. 20, 1933

INVENTOR
E. W. Brinkman
BY D. Clyde Jones
his ATTORNEY

UNITED STATES PATENT OFFICE 2,035,942

FEED FINGER FOR SCREW MACHINES AND THE LIKE

Earl W. Brinkman, Rochester, N. Y., assignor to Davenport Machine Tool Co. Incorporated, Rochester, N. Y., a corporation of New York Application October 20, 1933, Serial No. 694,427

2 Claims. (Cl. 29—62)

The present invention relates to feed-fingers for screw machines and similar machine tools.

In a screw machine the pieces are formed by feeding a long bar of stock forward step-by-step to a series of tools which form the shape in the length of the stock and then cut off the finished length. The stock is fed to the tools through a hollow sleeve or spindle by a feed-finger which reciprocates in the spindle and which grips the stock by spring tension. The stock is held during the shaping and cutting operations by a chuck and while these operations are going on, the feed-finger is drawn back in the spindle a distance equal to the length of the next piece of work plus the thickness of the cut-off tool plus a little additional length to insure feeding the stock against the positioning stop of the machine. When the piece has been formed and then cut-off, the chuck is released and the feed-finger is moved forward in the spindle to bring the new portion of stock into operative position. Then the chuck is again closed to grip the bar.

Heretofore, considerable difficulty has been experienced with the feeding of the final piece of the bar of stock.

Originally the forward end of the feed-finger was cut off square, that is, at right angles to the axial center line of the feed-finger because thus a long gripping surface is provided. But, as it is seldom that all of the bars of stock from which screws are being made are an exact multiple of the length required for one screw, it often happens that the last piece of the stock is so short that the feed-finger comes off of the rear end of the piece when the feed-finger is drawn back. In this case, when the chuck is opened and the feed-finger advanced, the forward end of the feed-finger pushes against the rear end of the piece of stock and may jam it against the positioning stop on the machine, straining the machine.

To avoid this it has become customary to countersink the forward end of the feed-finger to provide a flared opening of usually about forty-five degrees included angle. This permits the feed-finger to open up as it feeds forward and receive the rear end of the last piece of stock, thus eliminating jamming.

This improvement, however, has not been without its drawbacks, which in many cases prove serious. If the last piece of stock is of such length that the countersink in the feed-finger just extends over the rear end of the stock, when the feed-finger is in its rearward position, then, as soon as the chuck is opened, the stock will be shot forward through the open chuck by reason of the spring tension of the feed-finger. The action of the feed-finger is like the action of a person shooting a watermelon seed between his fingers. The piece of stock is flung forward and if the machine has a turret-type tool-holder, the stock is liable to become jammed between the tools and bent or the stop, tools or chuck may be broken.

The purpose of the present invention is to overcome the defects of previous constructions and to provide a feed-finger which will correctly feed the stock even to the last piece.

Various more or less complicated designs have been attempted, but after careful study and extensive experiment, I have discovered that if a feed-finger is provided at its forward end with a tapered opening or countersink of a small included angle, the finger will still open up around the end of a piece of stock, but will not tend to shoot the stock forward when it is not otherwise held. In other words, I have found that there exists an angle of repose, different for different sizes of stock, where, despite the taper of the opening or countersink, the jaws of the feed-finger will still grip the stock.

My invention is illustrated in the accompanying drawing, in which.

Figure 1:
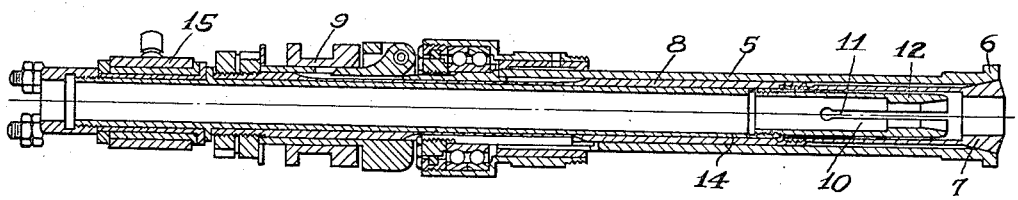
Fig. 1 is a longitudinal sectional view of the spindle of an automatic screw machine provided with a feed-finger constructed according to the present invention.
Figure 2:
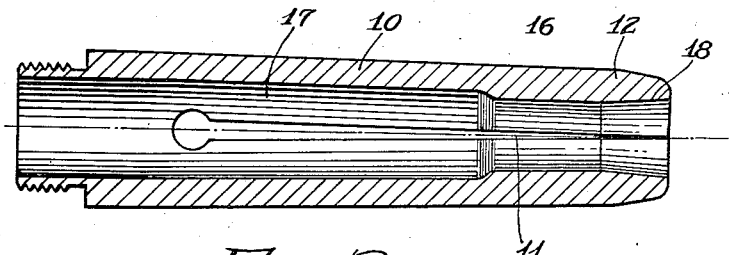
Fig. 2 is an enlarged longitudinal sectional view of the new feed-finger.
Figure 3:
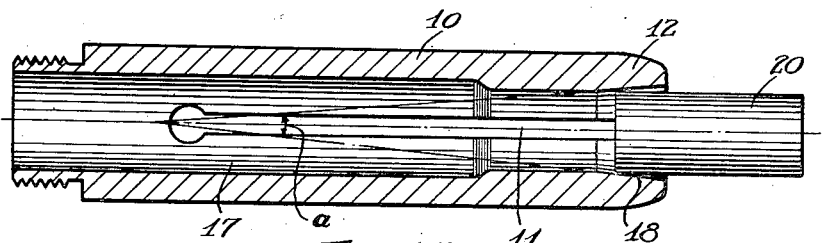
Fig. 3 is a view similar to Fig. 2, showing the action of the finger in gripping the end piece of a bar of stock.

In order that the position and use of the new feed-finger may be understood, I have shown the hollow work spindle 5 of the automatic screw machine. The forward end of this spindle 5 is formed to provide a nose-piece 6 which has a conical bore or seat that cooperates with the collet or chuck 7 to grip or hold the stock during operation on the same.

The collet or chuck 7 is threaded into the chuck-sleeve 8, which is connected to a head 9 that is periodically reciprocated to open and close the chuck.

The new feed-finger of my invention is designated at 10. This feed-finger is hollow or tubular and is provided with two or more longitudinal slots 11 to form gripping fingers 12.

The feed-finger is threaded at its rear end into a sleeve 14, which is reciprocable in the chuck sleeve 8. This sleeve is connected in any suitable manner to a head 15, that is reciprocated by a cam or other means, not shown, to feed the finger 10 forward and draw it back again. It is through the bore of the sleeve 14 and the bore of the feed-finger 10 that the bar of stock is fed.

The bore of the feed-finger, for a portion of its length, indicated at 16, is substantially coaxial with the spindle. This portion of the bore normally forms the gripping part of the finger. Back of this part 16, the bore is relieved as indicated at 17. Forward of the part 16, the bore is flared outwardly as indicated at 18 to provide conical gripping surfaces whose included cone angle $a$ is so small as to constitute an angle of repose such that when stock is held in the conical gripping surfaces 18, it will not be pushed forward by these surfaces. An angle of 15° included has proven good in some cases, while for other conditions, angles of between 5° and 25° can be used with success.

During operations on the stock, the work is clamped by the chuck 7 and the feed-finger 10 is in its rearward position ready to feed the stock forward. When the operations on the work have been completed and the work-piece has been cut off, the chuck sleeve 8 is moved forward in the spindle 5 to release the chuck. Then the feed-finger 10 is fed forward to push another portion of the stock into operative position and then the sleeve 8 is drawn back to cause the chuck 7 to clamp the new portion of stock. As soon as the chuck has clamped the stock, the sleeve 14 is moved back causing the feed-finger 10 to slide along the bar of stock and assume a gripping position another length back on the stock.

Now with my improved finger if the piece 20 of stock proves to be just long enough to lie within the outwardly flared portion 18 of the finger, no trouble can occur. When the chuck is opened, the piece 20 will not be shot forward. The angle of the jaws 18 is such that they will hold the piece 20 securely and feed it forward just as other lengths of stock have been feed on previous feed movements.

On the other hand, if the last piece of stock proves so short that the feed-finger when drawn back clears the rear end of the piece, no damage can be done, for the taper of the bore 18 of the feed finger is still such that the jaws of the feed-finger will open up over the end of the stock on the ensuing feed movement and not jam the stock against the positioning stop of the machine.

Hence, with my device, I have been able to provide a feed-finger that will readily accommodate itself to any length of stock and properly feed a bar of stock forward down to the last piece.

While a particular embodiment of the invention has been described, it will be understood that my invention is capable of still further modification and that this application is intended to cover any variations, uses, or adaptations of my invention falling within the scope of the invention and the limits of the appended claims.

Having thus described my invention, what I claim is:

1. A feed-finger for screw machines and the like comprising a tubular member having resilient gripping jaws formed by slotting said member longitudinally from its forward end rearwardly, said jaws having conical internal gripping surfaces at their forward ends which are rearwardly converging, the included cone angle of which is not more than 25°.

2. A feed-finger for screw machines and the like comprising a tubular member having resilient gripping jaws formed by slotting said member longitudinally from its forward end rearwardly, said jaws being provided with internal gripping surfaces at their forward ends which are outwardly flared at so small an angle to the axis of said member that a piece of stock will be securely held in said jaws against forward movement relative thereto.

EARL W. BRINKMAN.